April 19, 1927.
M. A. WAGNER
1,625,002
NURSING BOTTLE CONTAINER
Filed May 29, 1925
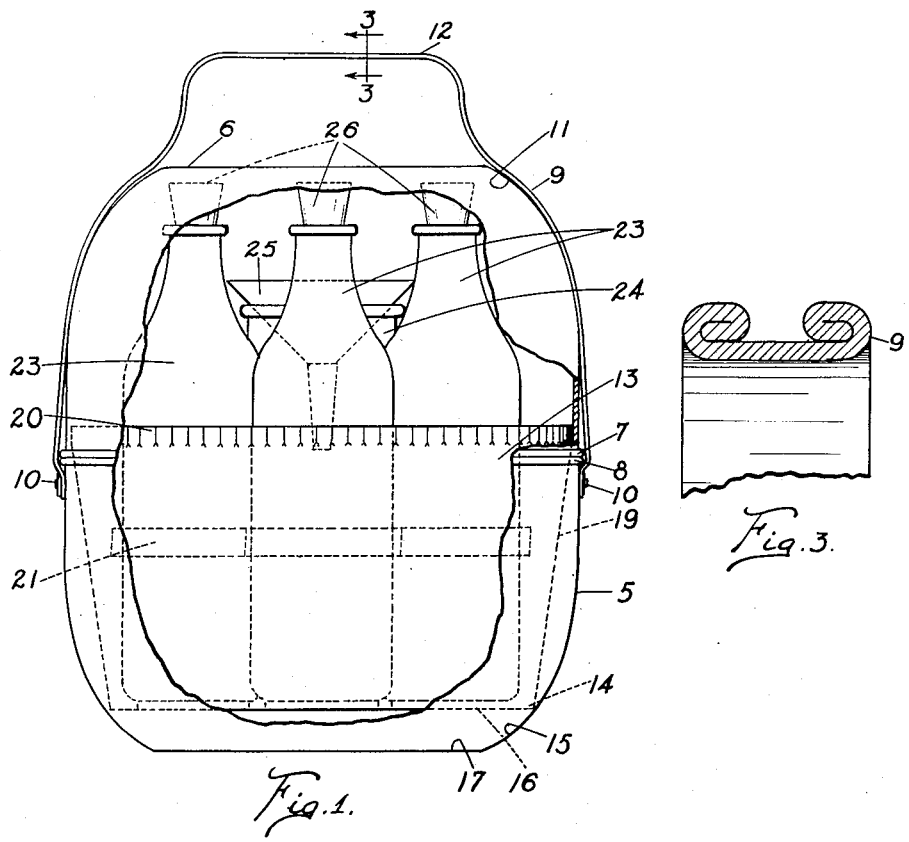
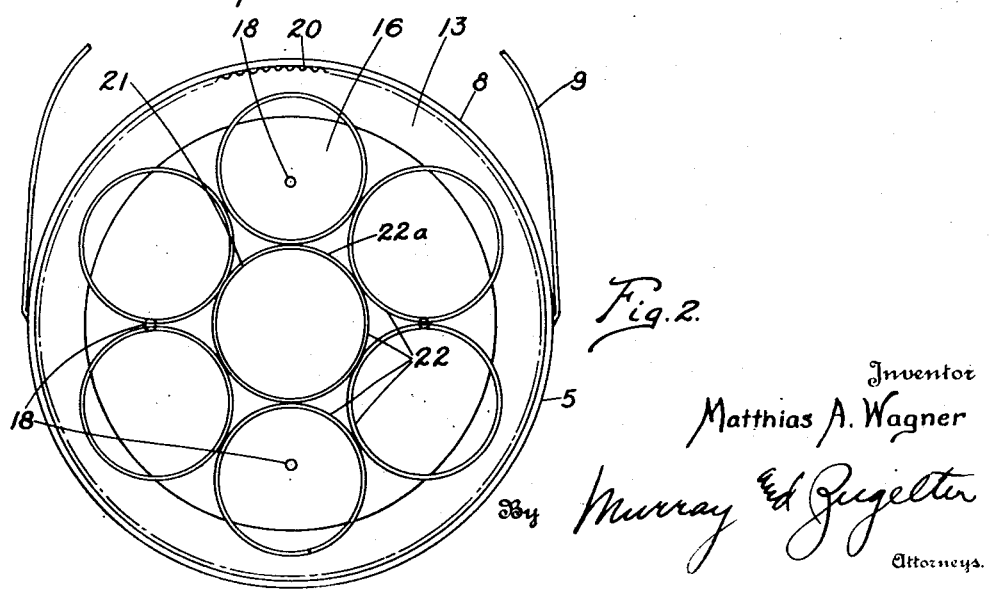
Inventor
Matthias A. Wagner Patented Apr. 19, 1927.

1,625,002

UNITED STATES PATENT OFFICE.

MATTHIAS A. WAGNER, OF TOLEDO, OHIO.

NURSING-BOTTLE CONTAINER.

Application filed May 29, 1925. Serial No. 33,780.

An object of my invention is to provide a compact container for holding a complete set of utensils necessary for holding a supply of infant's milk or other prepared nourishment.

Another object is to provide a container of the class described which may be conveniently transported, and is adapted to be filled with cracked ice, in order to keep milk or the like in proper condition.

Another object is to provide a device of this kind which occupies a minimum of space and portions of which may be readily used for other purposes.

Another object is to provide a device of this kind which is adapted to be tightly sealed with its own carrying or handle means so that it may be used as a sterilizer for the entire group of utensils.

These and other objects are attained by the means described herein and disclosed in the accompanying drawings, in which:

Fig. 1 is a side elevation of the device in an assembled form, parts being broken away to disclose the arrangement of parts therein.

Fig. 2 is a fragmental plan view of the device showing the position of a retaining means forming part of my invention.

Fig. 3 is a view taken on line 3—3 of Fig. 1.

The device of my invention comprises a bucketlike lower outer container 5 and a similar upper outer container 6, said upper and lower containers being of like diameters and depth and are adapted to be placed upon one another with the lips 7 and 8 in engagement. The container 5 is provided with a handle member 9 pivotally mounted thereon by means of suitable rivets 10. The handle 9 has its major side portions of a shape adapted to embrace the sides and a portion of the curved bottom 11 of the upper container or lid portion when it is placed upon the container 5 as shown in Fig. 1. The center portion 12 of the handle 9 is spaced at a distance from the bottom 11 of the upper container or lid 6, providing a curved handle or carrying means for the containers which are securely clamped one upon the other by the curved side portions of the handle 9. The containers 5 and 6 may thus be clamped and substantially sealed with the lips or beads 7 and 8 in engagement upon one another so that there is little likelihood of spilling a liquid in the lower container 5 when the upper or lid portion 6 is clamped thereon. The sealed closure formed in the manner just described also serves to preclude the escape of steam when the containers are used to sterilize the utensils placed therein. A second pan 13 is adapted to seat in the lower container 5 with its corner portion 14 engaging the inner curved portion 15 of the container 5 so that the bottom 16 of the pan 13 is spaced from the inner bottom wall 17 of the container 5. The bottom member 16 of the pan 13 is provided with a plurality of perforations 18 and the tapering side walls 19 extend for a distance above the lip or bead 8 of the lower container and terminate in a rounded and corrugated top edge 20. As will be apparent from Fig. 1, the pan 13 may be readily grasped by the corrugated portion 20 which extends above the lip 8 of the container 5. The perforations 18 in the bottom of the pan 13 will permit draining of any liquid, for example water from melted ice, into the container 5 when the pan 13 is removed. This feature is also useful in removing the pan and utensils contained therein after the device has been used as a sterilizer. The corrugated edge 20 which extends above the lip 8 of the container 5 also serves as a yielding ledge against which the mouth of the upper container 6 may engage to preclude such upper container from being accidentally pushed off of the lower container when the handle 9 is out of clamping engagement. This corrugated lip 20 also serves to form a more effective leak-proof connection between the upper and lower containers. A utensil retainer 21 is formed by securing together a series of flat ring members 22 which in this instance are 7 in number and are arranged with a series of six of the rings tangent to the adjacent rings and the six rings grouped about and secured to a central seventh ring. The rings 22 are secured upon one another at their tangent portions by means of brazing, soldering, riveting or the like so that the entire group of rings may be handled as a unit and may be placed in the pan 13 with the outermost portions of the group of rings engaging the tapered walls of said pan intermediate the top and bottom thereof. Inasmuch as the container is primarily designed to carry a day's supply of milk or the like for infants, the retaining rings are normally of a size adapted to receive a nursing bottle or milk bottle such as 23, and the particular design and arrangement of the retaining member provides for the reception of seven of the nursing bottles 23. The central ring 22ª may be employed to retain any other kind of cylindrical utensils such as 24 in which prepared ingredients may be carried to be added to the milk which would be carried in the nursing bottles 23. A small funnel such as 25 may be conveniently placed upon the central container 24 either in its normal position as shown or in an inverted position. The bottles 23 may be provided with any suitable closure means such as corks 26 in order to prevent spilling of the contents of such bottles. The corks or other closure means as will be noted in Fig. 1 extend very close to the inverted bottom of the upper container 6 so that the entire device may be toppled over or inverted without effecting any substantial disarrangement of the utensils or spilling of the contents thereof.

As will be noted I have provided a very convenient arrangement of containers and utensils which may be adapted to all conditions and operations necessary in caring for infants' food and the utensils employed in the proper care thereof. The device, however may readily be adapted to numerous other uses by a mere change of size and position and slight change in design. As will be readily apparent, the device is useful both in the home, in traveling or in camping, and the various parts such as the upper and lower containers 5 and 6 as well as the remainder of the utensils may be readily employed for other purposes.

What I claim is:

1. In a device of the class described the combination with a lower container having an enlarged beaded mouth, an upper container having a similar enlarged beaded mouth adapted to be placed in abutment with the mouth of the lower container, a pan having tapered sides and a curved corrugated mouth adapted to be nested in the lower container with the corrugated mouth projecting above the beaded mouth of the lower container, the projecting portion of the pan serving as a frictional ledge for the upper container when said containers are mounted one upon the other, and handle means for binding the containers and pan one upon the other in the position mentioned.

2. In a device for transporting and conditioning liquid food for infants the combination of a pair of containers each having a beaded mouth portion and a rounded bottom portion, a handle member on one of the containers adapted to frictionally engage the sides and bottom portions of the other container when the beaded mouth portions of said containers abut one another and a pan seated upon the rounded portion of the first mentioned container and extending above the mouth thereof for frictional engagement with the inside of the second container.

In testimony whereof, I have hereunto subscribed my name this 27th day of May, 1925.

MATTHIAS A. WAGNER.